(12) United States Patent
Olivo et al.

(10) Patent No.: US 10,017,272 B1
(45) Date of Patent: Jul. 10, 2018

(54) LOCAL ELECTRONIC ENVIRONMENTAL DETECTION DEVICE

(71) Applicants: James Olivo, Margate City, NJ (US); Lan Hei Lin, Voorhees, NJ (US); Vinh Hoang, Egg Harbor Town, NJ (US)

(72) Inventors: James Olivo, Margate City, NJ (US); Lan Hei Lin, Voorhees, NJ (US); Vinh Hoang, Egg Harbor Town, NJ (US)

(73) Assignee: James Olivo, Margate City, NJ (US)

( * ) Notice: Subject to any disclaimer, the term of this patent is extended or adjusted under 35 U.S.C. 154(b) by 0 days.

(21) Appl. No.: 14/715,605

(22) Filed: May 19, 2015

Related U.S. Application Data (60) Provisional application No. 62/000,642, filed on May 20, 2014.

(51) Int. Cl.
| B64D 45/00 | (2006.01) |
| G08G 5/00 | (2006.01) |
| G08C 17/02 | (2006.01) |

(52) U.S. Cl.
CPC ............ *B64D 45/00* (2013.01); *G08C 17/02* (2013.01); *G08G 5/0013* (2013.01)

(58) Field of Classification Search
CPC ........... G01W 1/08; G01W 1/00; G01W 1/10; G01W 2001/003; G01K 2203/00; G02B 2027/0187; G02B 27/017; G06F 3/012; G06F 3/0346; G06F 3/011; G08G 5/0091; G08G 5/0013; B64C 13/08; B64C 13/18; B64C 13/22; B64D 45/00; H03B 2200/0088; G01C 21/10; G01C 23/005; B64F 5/60

USPC ..... 701/1, 3, 14, 16, 528, 22, 31.5, 42, 537; 702/2, 3; 715/716, 864; 73/1.38, 382 G; 345/156, 179, 633; 340/539.13; 348/144, 352; 455/127.5; 601/35
See application file for complete search history.

(56) References Cited

U.S. PATENT DOCUMENTS

| 2002/0092350 A1* | 7/2002 | Etkin | G01V 7/16 73/382 G |
| 2003/0095155 A1* | 5/2003 | Johnson | G06F 1/1626 715/864 |
| 2004/0140965 A1* | 7/2004 | Wang | G06F 3/0317 345/179 |
| 2005/0278120 A1* | 12/2005 | Manfred | G01W 1/10 702/2 |
| 2006/0080004 A1* | 4/2006 | Cheok | G01C 15/14 701/1 |
| 2007/0073485 A1* | 3/2007 | Manfred | G01W 1/10 702/2 |
| 2009/0069960 A1* | 3/2009 | Lapp | G05D 1/0077 701/16 |
| 2009/0315704 A1* | 12/2009 | Rosing | G06Q 10/08 340/539.13 |

(Continued)

*Primary Examiner* — Anne M Antonucci
*Assistant Examiner* — Sanjeev Malhotra
(74) *Attorney, Agent, or Firm* — Frederic M. Douglas (57) ABSTRACT

The present invention relates to a method and system for gathering data along points of travel using common portable electronic devices that are typically used for other functions. More specifically, the data gathered by these portable electronic devices may be accessed, processed, validated, and used in conjunction with, or alone, to produce, augment, and/or validate other data sets across wide ranges of science and technology.

19 Claims, 8 Drawing Sheets

(56) References Cited

U.S. PATENT DOCUMENTS

| | | | | |
|---|---|---|---|---|
| 2010/0042275 A1* | 2/2010 | Kirk | G01W 1/08 | 701/14 |
| 2011/0029202 A1* | 2/2011 | Horiuchi | B60T 8/17555 | 701/42 |
| 2011/0137496 A1* | 6/2011 | Everett | B64C 13/08 | 701/3 |
| 2011/0257818 A1* | 10/2011 | Ganz | G01W 1/00 | 701/14 |
| 2011/0282529 A1* | 11/2011 | Song | B60L 15/20 | 701/22 |
| 2011/0288453 A1* | 11/2011 | Endo | A61H 1/0244 | 601/35 |
| 2012/0259549 A1* | 10/2012 | McDonald | G01W 1/00 | 702/3 |
| 2013/0027555 A1* | 1/2013 | Meadow | H04N 7/18 | 348/144 |
| 2013/0194486 A1* | 8/2013 | Shah | H04N 5/23254 | 348/352 |
| 2013/0197725 A1* | 8/2013 | O'Dell | H04L 67/125 | 701/14 |
| 2013/0197739 A1* | 8/2013 | Gallagher | B64F 5/60 | 701/31.5 |
| 2014/0074326 A1* | 3/2014 | Pereira | G01W 1/00 | 701/14 |
| 2014/0129938 A1* | 5/2014 | Tang | G02B 27/017 | 715/716 |
| 2014/0235188 A1* | 8/2014 | Lee | H01M 10/465 | 455/127.5 |
| 2015/0185855 A1* | 7/2015 | Elak | G06F 3/0487 | 345/156 |
| 2015/0279050 A1* | 10/2015 | Yang | G06T 19/006 | 345/633 |
| 2015/0339930 A1* | 11/2015 | McCann | G08G 5/0039 | 701/528 |
| 2016/0077125 A1* | 3/2016 | Buck | G01C 21/16 | 73/1.38 |
| 2016/0133137 A1* | 5/2016 | Rencher | G08G 5/0091 | 701/537 |

\* cited by examiner

LOCAL ELECTRONIC ENVIRONMENTAL DETECTION DEVICE

CROSS-REFERENCE TO RELATED APPLICATION

This application claims priority from U.S. Provisional Patent Application No. 62/000,642, filed on May 20, 2014, the contents of which are incorporated herein by reference.

BACKGROUND OF THE INVENTION

This invention relates to a method and system for gathering data along points of travel using common electronic devices that are typically used for other primary functions. More specifically, the data gathered by these electronic devices can be accessed, processed, validated and used in conjunction with, or alone, to produce, augment, and/or validate other data sets across wide ranges of science and technology.

The phenomenon of atmospheric turbulence is caused from a variety of meteorological forces including atmospheric heating, cooling, pressure, and density change. The typical method used for determining atmospheric turbulence uses a series of techniques that involve calculations applied to weather models. Several weather models exist and around the world there are different weather models. Typically, the meteorological components within these models are somewhat the same; but what differentiates them from one another is the geographical space they cover, the resolution of coverage within the space, and the frequency by which the models are generated.

Currently, there is a turbulence model produced by NOAA that uses the Rapid Refresh (RAP) model. The RAP in conjunction with other meteorological and non-meteorological data produces an hourly National Turbulence Product known as the Graphical Turbulence Guidance (GTG) model. Some airlines further enhanced this data by adding data points generated from particular sensors located on their aircraft. This equipment automatically downlinks the data via radio frequency and data link channels to ground based systems that then refer the data back to the airline where it is ingested and used in a variety of ways.

Portable devices are increasingly used for multiple tasks that range from navigation, motion detection, telephony, to video and/or photographs, to computing, to audio, and other entertainment and instructional uses. Portable devices may be used to facilitate communication, including via a communication service. Such devices may include mobile telephones, personal digital assistants (PDAs), portable video/music players, electronic books, electronic book readers, tablet computers, portable gaming devices, and the like. Some of such devices include the iPad (trademarked by Apple, Inc.), the iPod (trademarked by Apple, Inc.), the iPhone (trademarked by Apple, Inc.), the BlackBerry (trademarked by RIM, Inc.), the Android (trademarked by Google, Inc.), Android-based devices, and other portable devices.

It would be advantageous to provide an apparatus, method, and system that would include one or more of the features of 1) monitoring aircraft turbulence and other motions; 2) monitoring portable electronic device motions, including motions coordinated with an aircraft's motions; 3) communicating motion data to a communication link; 4) sharing the motion data with other aircraft and air traffic control entities; and 5) providing instructions on how to avoid entering areas of air turbulence.

SUMMARY OF THE INVENTION

The aviation industry manufactures specialized equipment to gather data very specific to its needs. This invention focuses on fulfilling the particular data need via equipment carried into the vessel, aircraft, by crew, and passengers. The implementation of the description of this invention will provide a new data set that can be examined and processed to provide an increased benefit to the crew and passengers. Data may also be used to assist and improve existing technologies and data sets by providing a greater surveillance of environments that in the past had not been examined or not readily accessed.

The goal of this invention is to gather specific environmental data from personal electronic devices such as cell phones and tablets. This data will be generated from components of the device onboard capabilities including the device's gyroscope, magnometer, seismometer, and accelerometer. Data from these components can assist in measuring shaking and both horizontal and vertical motions. Such motion detected simultaneously across a group of devices from within the same vessel would indicate an externally generated motion. This motion, experienced in addition to other motion that is constant, can deliver data similar to specialized equipment mounted within the vessel to determine turbulence.

In one aspect of the present invention, a method for determining a turbulent condition in an aircraft with a portable device having a gyroscope, seismometer, magnetometer, and an accelerometer comprises receiving an output from each of the gyroscope, seismometer, magnetometer, and an accelerometer while the portable device is situated within an aircraft, comparing, by a processor, the received outputs to corresponding turbulence threshold values for the received outputs, providing, by the processor, an indication on the portable device or the aircraft, of a turbulent condition when the comparing indicates at least one of the received outputs exceeds the corresponding turbulence threshold value, communicating the at least one of the received outputs from the portable device or the aircraft to a ground-based computer.

In another aspect of the present invention, a method for determining a turbulent condition in an aircraft with a portable device having a gyroscope and a seismometer comprises receiving an output from each of the gyroscope and seismometer while the portable device is situated within the aircraft, comparing, by a processor, the received outputs to corresponding turbulence threshold values for the received outputs, providing, by the processor, an indication on the portable device or the aircraft, of a turbulent condition when the comparing indicates at least one of the received outputs exceeds the corresponding turbulence threshold value.

In yet another aspect of the present invention, a method for determining a turbulent condition in an aircraft with a portable device having an accelerometer and a seismometer comprises receiving an output from each of an accelerometer and a seismometer while the portable device is situated within the aircraft, comparing, by a processor, the received outputs to corresponding turbulence threshold values for the received outputs, providing, by the processor, an indication on the portable device or the aircraft, of a turbulent condition when the comparing indicates at least one of the received outputs exceeds the corresponding turbulence threshold value.

These and other aspects, objects, features and advantages of the present invention, are specifically set forth in, or will become apparent from, the following detailed description of an exemplary embodiment of the invention when read in conjunction with the accompanying drawings.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Onboard aircraft systems may successfully detect and monitor aircraft status, position, turbulence, and other characteristics. The present invention follows a similar path to success, except the specialized equipment on the aircraft is substituted with passenger electronic devices that have gyroscopic, seismometer, accelerometer, magnetometer, and other capability, and where the data communication is substituted with the available WIFI within the cabin of the aircraft. Information from these components can yield an event that may be turbulence or other environmental aspect that would be of significant interest. For the first phase of this invention, it is believed that a particular event would require data from several devices located within the same vessel in an effort to eliminate false positives such as a routine device drops or other non-environmentally driven motion. An algorithm may examine the data to view for harmonized motions spanning the group of devices to convey an environmental disturbance.

A clear understanding of the key features of the invention summarized above may be attained by referencing the below figures, which illustrate the method and system of the invention, although it will be understood that such drawings depict various exemplary embodiments of the invention and, therefore, are not to be considered as limiting scope with regard to other embodiments which the invention is capable of contemplating.

Figure 1:
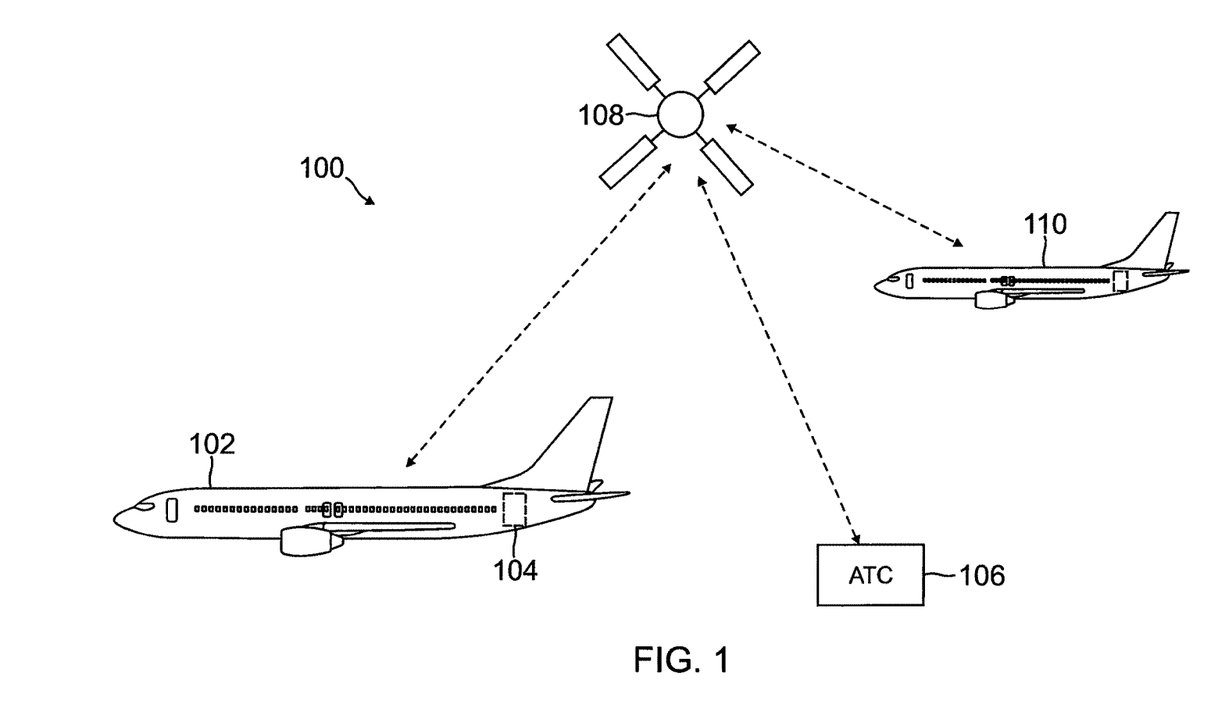
FIG. 1 is a schematic illustration of an air turbulence system, according to an embodiment of the present invention.

FIG. 1 shows an air turbulence system 100 according to an exemplary embodiment of the present invention. An aircraft 102 may include a turbulence detector 104 to detect in-flight air turbulence and communicate this information to a remote air traffic control site 106, such as via satellite 108. When turbulence is detected in a particular location other aircraft may be contacted to avoid this area. For example, the air traffic control site 106 may contact, such as via the satellite 108, another aircraft 110 having flight plans intersecting an identified area of turbulence. The turbulence information may include severity, location (e.g., latitude, longitude, and altitude), time stamp, flight number, aircraft identification, duration, time since last detection, and the like.

Figure 2:
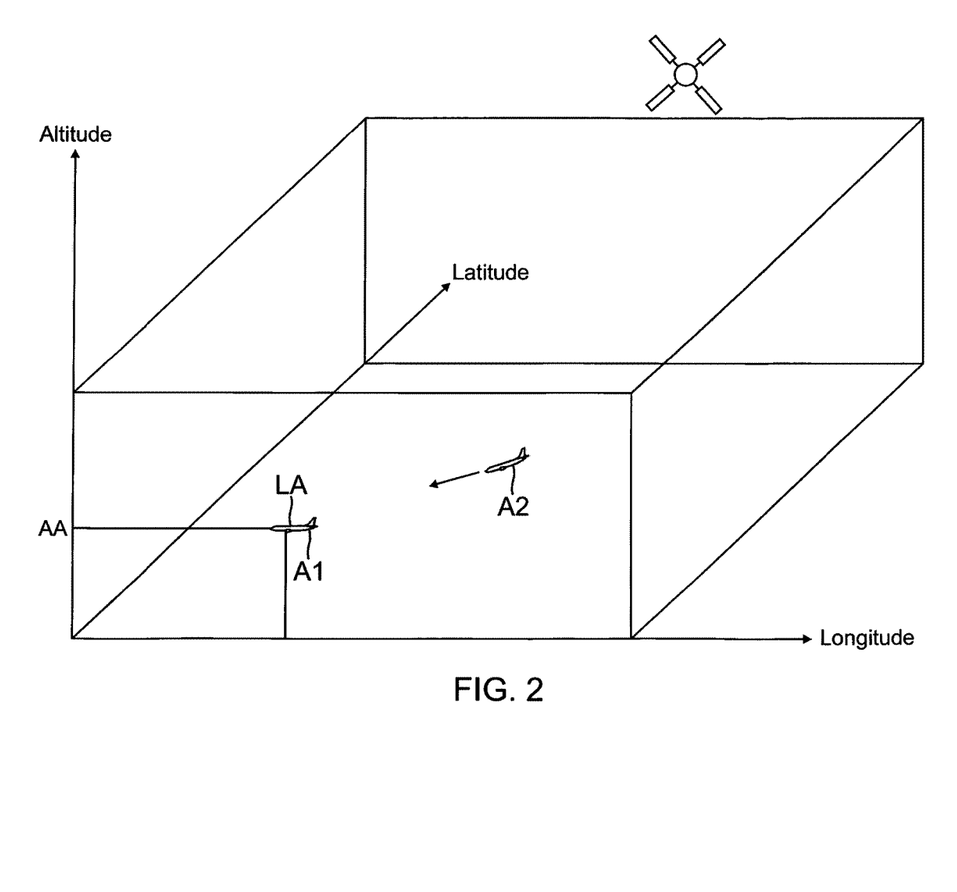
FIG. 2 is a graphical representation of flights and an area of turbulence that may be avoided, according to another embodiment of the present invention.

In FIG. 2, a turbulence detector aboard a first aircraft A1 may encounter turbulence at location LA and at altitude AA. The systems aboard the first aircraft A1 may report the turbulence to air traffic control (such as ATC 106 in FIG. 1), optionally via communication with satellite 206. Air traffic control may identify a second aircraft A2 that may be approaching location LA. Coordinates, such as latitude, altitude, and longitude, may be used for positioning. The route for the second aircraft A2 may be modified to avoid the turbulence reported to have been experienced by the first aircraft A1. The pilot of the second aircraft may be alerted to the turbulence and possibly change the second aircraft's route. In one example, the turbulence may be avoided by changing the altitude of the second aircraft A2.

Figure 3:
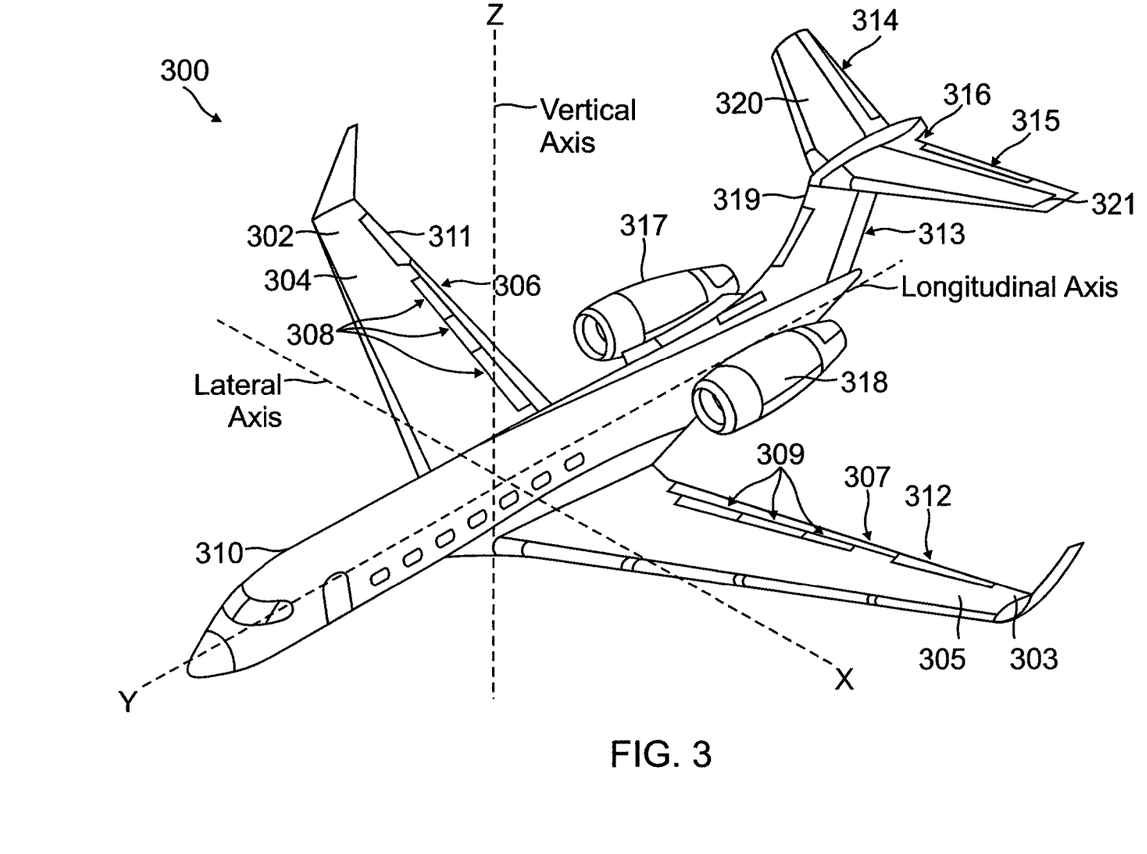
FIG. 3 shows an exemplary perspective view of an aircraft, according to yet another embodiment of the present invention.

FIG. 3 is a perspective view of an aircraft 300 that may be used according to an embodiment of the present invention. In one example, aircraft 300 may include a fuselage 310, two main wings 302, 303, a vertical stabilizer 319, an elevator 316 which may include two horizontal stabilizers 320, 321 in a T-tail stabilizer configuration, and two jet engines 317, 318. For flight control, the two main wings 302, 303 may each have an aileron 304, 305, an aileron trim tab 311, 312, a spoiler 308, 309 and a flap 306, 307, while the vertical stabilizer 319 may include a rudder 313, and the aircraft's horizontal stabilizers (or tail) 320, 321 each including an elevator trim tab 314, 315. Although not shown in FIG. 3, the aircraft 300 may also include an onboard computer, aircraft instrumentation, portable electronic devices, and various control systems and sub-systems.

Figure 4:
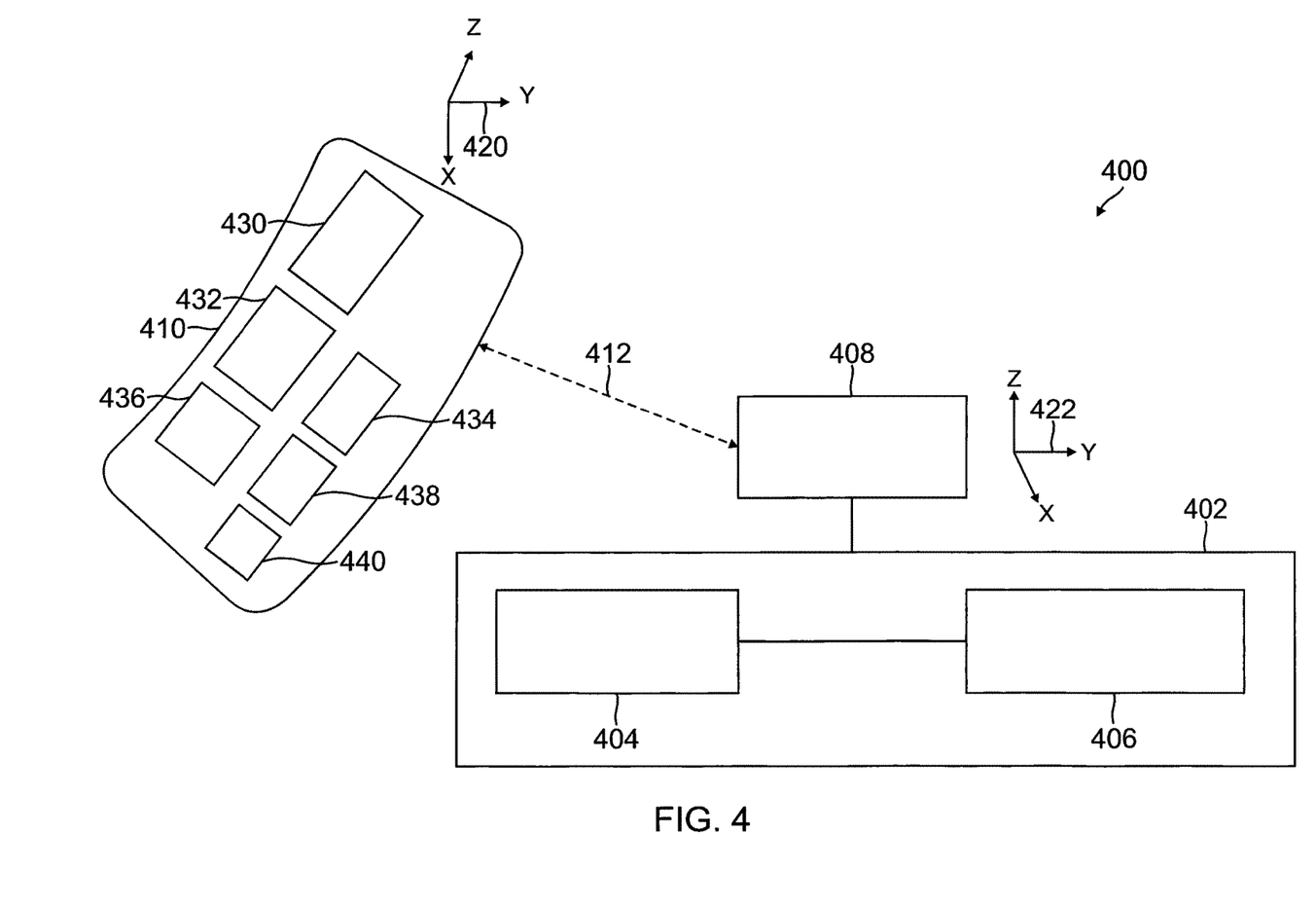
FIG. 4 shows a schematic view of a portable device aboard an aircraft, in communication with aircraft systems, according to a still yet another embodiment of the present invention.

In FIG. 4, portable electronic device 410 (such as a smartphone, tablet, and the like) may be aboard an aircraft 400. The portable electronic device 410 may have a correctional feedback to adjust the output of the sensors 432, 434, 436, 438, 440 based on the determined attitude of the portable electronic device 410 relative to the attitude of the aircraft 400. The portable electronic device 410 may have a first coordinate system 420 and the aircraft 400 may have a second coordinate system 422. The relative attitude of the portable electronic device 410 and the aircraft 400 may be compensated for. For example, a transformation matrix may be generated to relate the first coordinate system 420 and the second coordinate system 422 in determining the relative attitude of the portable electronic device 410 and the aircraft 400.

The portable electronic device 410 may comprise a mobile processor 430, an accelerometer 432, a seismometer 434, a gyroscope 436, a magnetometer 438, and a memory 440. The portable electronic device 410 may interface with a cellular phone network that operably couples to a network.

This provides a means of communication between the portable electronic device 410 and an aircraft communication system. Similarly, other network appliances, for example, smartphones, computers, laptops, tablets, Internet-based applications, browsers, browser-based systems, and java applets interface with the aircraft communication system to allow gathering and reporting of data. One advantageous embodiment will involve "apps" such as applications available on the iPad (trademarked by Apple, Inc.), the iPod (trademarked by Apple, Inc.), the iPhone (trademarked by Apple, Inc.), the BlackBerry (trademarked by RIM, Inc.), the Android (trademarked by Google, Inc.), Android-based devices, and other portable devices, and the like. Apps, such as smartphone apps may be integrated and enabled with in-build voice instruction functions or other voice-operated features, such as commonly used with smartphones (e.g., Siri).

A controller 402 may be operably coupled to components of the aircraft 400. The controller 402 may include memory 404, including random access memory (RAM), read-only memory (ROM), flash memory, or one or more different types of portable electronic memory, such as discs, DVDs, CD ROMs, media cards, and the like or any suitable combination of these types of memory. The controller 402 may include a processor 406, which may be running any suitable programs to implement a graphical user interface (GUI) and operating system. These programs may include a device driver that allows a user to perform functions. The controller 402 may be a portion of a Flight Management System (FMS) or may be operably coupled to the FMS.

A computer searchable database of information may be stored in the memory 404 and accessible by processor 406. The processor 406 may run a set of executable instructions to display the database or access the database. Alternatively, the controller 402 may be operably coupled to a database of information. For example, a database may be stored on an alternative computer or controller. The database may be any suitable database, including a single database having multiple sets of data, multiple discrete databases linked together, or even merely a simple table of data.

The controller 402 may also be connected with other controllers (not shown) of the aircraft 400. The controller 402 may be capable of linking wirelessly with other systems or devices through a wireless communication link 408, which may be included in the aircraft 400 and may be communicably coupled to the controller 402 so that the controller 402 may transfer information via connection 412 (wired or wireless) with wirelessly connected devices and systems through the wireless communication link 408. Such a wireless communication link 408 may include, but is not limited to, packet radio, satellite uplink, Wireless Fidelity (WiFi), WiMax, AeroMACS, Bluetooth, ZigBee, 3G Wireless signal, code division multiple access (CDMA) Wireless signal, global system for mobile communication (GSM), 4G Wireless signal, long term evolution (LTE) signal, Ethernet, other methods of communication, or any combinations thereof.

Figure 5:
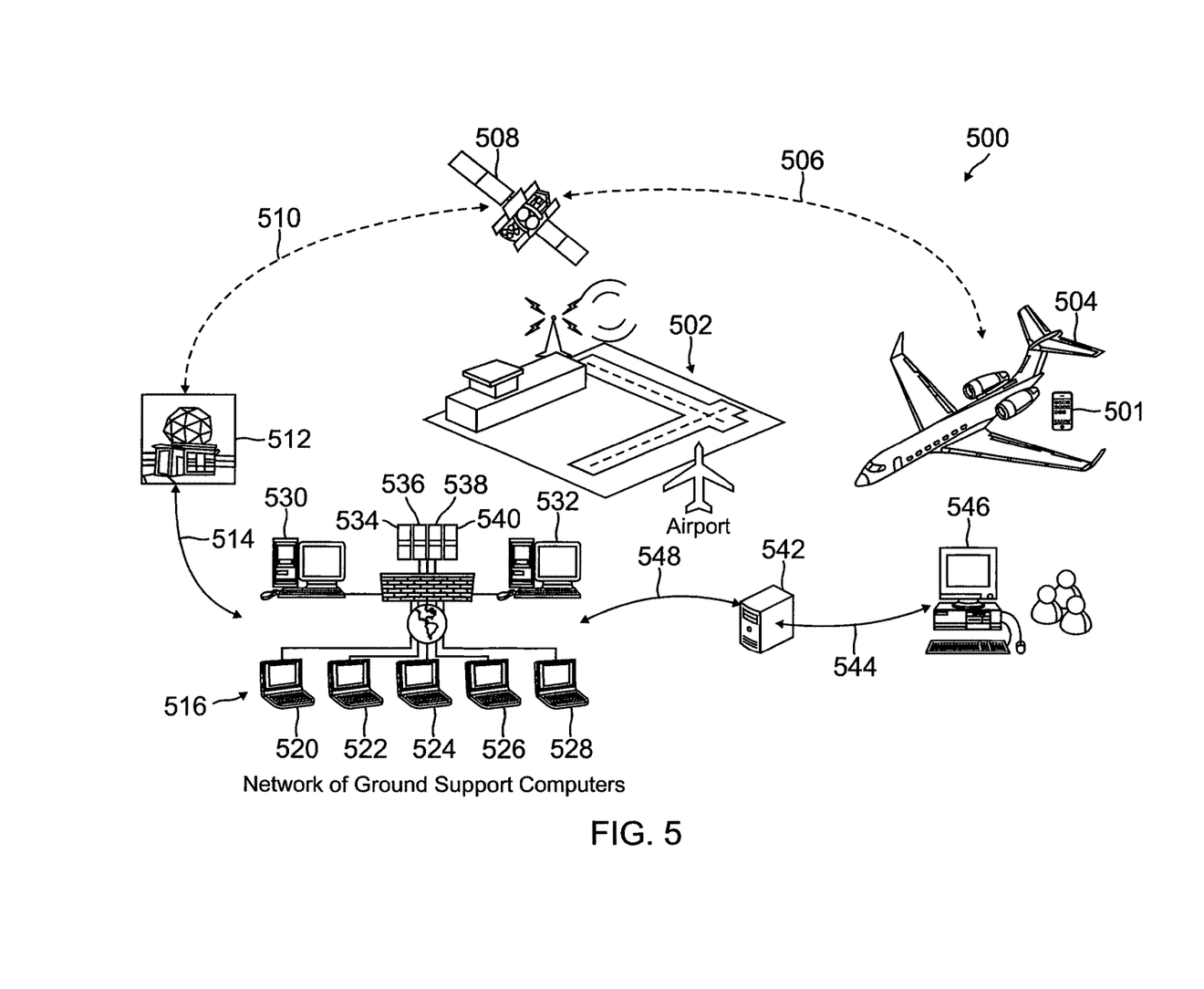
FIG. 5 illustrates a system for aircraft monitoring and various sub-systems, according to a further embodiment of the present invention.

FIG. 5 is a system 500 for performance and trend monitoring of an aircraft 504 and the aircraft's various sub-systems according to an embodiment of the present invention. As used herein, the term "performance monitoring" refers to the process of collecting and evaluating relevant parameters and/or measured data to determine the state, status, or numerical output value of a component and/or sub-system in any time period. As used herein, the term "trend monitoring" refers to the process of collecting and evaluating relevant parameters and/or measured data to determine the state, status, or numerical output value of a component and/or sub-system in any time period in order to predict, estimate, or trend, said state, status, or numerical output value of a component and/or sub-system at a future time.

The system 500 may include an aircraft 504, a satellite 508 that is communicatively coupled to the aircraft 504 and a gateway 512 via satellite communication links 503, 510, a ground support network 516 that may include at least one ground-based computer 520 (FIG. 5 illustrates an exemplary implementation with eleven computers 520 thorough 540), and another computer 546 that may be coupled to the ground support network 516 via server 542. The computer 546 may be located, for example, at an aircraft monitoring center of either an operator or the aircraft manufacturer. The system 500 may communicate with systems at an airport 502. While the aircraft 504 is in flight, the aircraft 504 may transmit data over a satellite communication link 506. For example, in one embodiment, the data transmitted by the aircraft 504 while in flight comprises a Crew Alerting System (CAS) message generated by the on-board computer (not shown in FIG. 5, but similar to the systems shown in FIG. 4) of the aircraft 504. Communication may be performed via one or more portable electronic devices 501, independently, or in coordination with other communication equipment aboard the aircraft 504.

Many aircraft use Crew Alerting System (CAS) messages to provide engine and aircraft system fault information to the crew. CAS messages are annunciated to the crew based on triggers and logic embedded in an avionics suite. The logic typically receives inputs from all reporting aircraft systems and sub-systems. A CAS message is triggered when the combination of received inputs meets predetermined criteria of embedded logic. This may be Boolean or binary type inputs, or floating point parameters. Once the logic criteria have been satisfied, the avionics suite may display a message to the crew in either Red (warning), Amber (caution), or Cyan (advisory). Many CAS messages display failure or fault information to the crew. In the instances when failure or fault information is displayed, it is assumed that the system has experienced an anomaly and a corrective action must be performed to successfully extinguish the CAS message. The system records all of the CAS parameters at any given time. The CAS parameter value of the message has a zero value until the CAS message becomes active. Once active, the value of the CAS parameter value changes from zero to an integer between one (1) and sixty three (63) depending on what failed. As the CAS messages are recorded, the system may detect when the value of the parameter changes from zero to a non-zero value.

The CAS message includes unprocessed data. The CAS message automatically indicates that measured data for a relevant parameter or variable of a sub-system of the aircraft is outside one or more threshold limits and that an abnormal condition has been detected. In accordance with some of the disclosed embodiments, when a CAS message is generated on-board the aircraft 110, data for parameters associated with that particular CAS message are automatically measured and stored in a file that is transmitted to the ground support network 516. Aircraft maintenance and engineering personnel can determine based on experience a number of different parameters that are the typical triggers for each particular CAS message. As such, for each particular CAS message, parameters and their respective thresholds (e.g., upper and/or lower thresholds for each parameter) may be pre-defined.

The aircraft on-board computer or personal electronic device 501 may be configured to open a communication path that includes a first satellite communication link 506 between the aircraft 504 and the satellite 508 and a second satellite communication link 510 between the satellite 508 and the ground-based gateway 512. The satellite 508 may be communicatively coupled to the aircraft 504 and to the gateway 512 via satellite communication links 506, 510, respectively, and any servers between the aircraft 504 and the gateway 512. The on-board computer of the aircraft 504 and/or the personal electronic device 501 may communicate the CAS message file (or other alerts, data, files, or information) over the first satellite communication link 506 to the satellite 508. The satellite 508 may communicate the CAS message file over the second satellite communication link 510 to the gateway 512, and the gateway 512 may communicate the CAS message file to the ground support network 516 via communication link 514.

The ground support network 516 may be operated by a different party or entity from the party or entity operating the aircraft 504. The ground support network 516 may include several performance management algorithms that are used to process data and data files received from the aircraft 504. The appropriate performance management algorithms may be employed and the ground support network 516 may generate web pages that are provided to the server 542. The web pages include information regarding aircraft performance and/or fleet performance. The web pages may include the processed data generated from unprocessed data communicated from the aircraft 504, data files from the aircraft 504, information derived from the processed data or data files, and the like. The web pages may also include information that identifies elements of the aircraft 504, such as sub-systems (or components thereof), which may need to be inspected.

The ground support network 516 may include at least one ground-based computer 520 (eleven computers 520 through 540 are illustrated in the exemplary embodiment of FIG. 5). In one exemplary, non-limiting embodiment, the ground-based computer 520 of the ground support network 516 is configured to process the unprocessed data from the CAS message file (or other alerts, data, files, or information) that was transmitted from the aircraft 504 to generate the processed data. For example, when the file corresponding to the CAS message (or other alerts, data, files, or information) is received and loaded at one of the ground based computers 520-540 of the ground support network 516, the ground-based computer 520 may load and execute an appropriate Aircraft Health and Trend Monitoring (AHTM) program module that corresponds to the particular CAS message indicated in the file. When the ground-based computer 520 executes a Health and Trend Monitoring Algorithm (HTMA), the measured data for each of the parameters that are included in the file may be analyzed to determine which of the parameters are at an abnormal level (e.g., outside of its upper and/or lower threshold limits), and thus most likely causing a particular CAS message to be generated.

For example, in some embodiments, each of the parameters may be compared to one or more thresholds, and any parameters that are determined to be outside those threshold(s) can be identified as being a potential cause of the CAS message. When the measured data for any parameter is determined to be abnormal, the HTMA can flag the abnormality and the parameters that are outside of their respective threshold(s) may be stored in as processed data in a processed data file.

In some embodiments, the processed data may also indicate particular sub-system(s) (or components thereof) that each of the parameters are associated with. The particular sub-system(s) (or components thereof) may be identified and flagged for further inspection to determine whether they are operating correctly or whether corrective actions may need to be taken.

The ground support network 516 may be coupled to the server 542 via a communication link 548. The server 542 may serve as a portal to the ground support network 516, and serve the web pages from the ground support network 516 to the computer 546 so that the web pages may be displayed. Among other information, the ground-based computer 520 may communicate the processed data (that was generated from the unprocessed data received from the aircraft 504) to the server 542 via the web pages.

The computer 546 may be coupled to the ground support network 516 via a communication link 544 to the server 542. The computer 546 may allow communication to the ground support network 516, for example, from a system operator and/or another computer system, and may be implemented using any suitable method and apparatus. The information generated at the ground support network 516 may be viewed by personnel or an operator at the computer 546. The computer 546 may include one or more network interfaces to communicate to other systems or components, one or more terminal interfaces to communicate with technicians, and one or more interfaces to connect to the ground support network 516.

The server 542 may communicate the processed data to the other computer 546. Although not illustrated in FIG. 5, the computer 546 may include a processor that can perform processing, either automatically or in response to input from an operator, to generate a parameter request message. In some scenarios, the processing may be performed based on, or in response to, processed data that was generated based on data received from the aircraft 504 while in flight. The parameter request message may include a parameter file that specifies relevant parameters that have been selected to be measured and recorded at the aircraft 504 to provide the additional parametric data. In some embodiments, the parameter file may also include a duration value for each relevant parameter. Each duration value specifies how long parametric data for that particular relevant parameter are to be measured and recorded.

In one non-limiting, exemplary embodiment, the relevant parameters may be selected either automatically by software or by a human operator. In one embodiment, the relevant parameters may be determined based on analysis of the processed data either automatically by software or by a human operator that analyzes the processed data. Each of the relevant parameters may correspond to additional parametric data that is needed from the aircraft 504 to identify one or more sources that are causing an abnormal condition (e.g., that caused the CAS message to be generated). In some implementations, each relevant parameter can influence or affect data that is to be measured by the aircraft 504 and/or the portable electronic device 504.

In some embodiments, the relevant parameters may be determined using computer software that is implemented at a computer to analyze the processed data to determine relevant parameters that are to be measured at the aircraft to provide the additional data. In some embodiments, the relevant parameters may be determined by an operator on any basis, observation, or information. The operator may, for example, view the processed data via a computer interface and manually identify and select relevant parameters at computer 546 based on the processed data.

The computer 546 may communicate the parameter request message to the server 542, which may communicate the parameter request message to the ground support network 516. The ground support network 516 may communicate the parameter request message to the gateway 512, which may communicate the parameter request message to the satellite 508 via the second satellite communication link 510. The satellite 508 may communicate the parameter request message to the aircraft 504 via the first satellite communication link 506.

The aircraft 504 includes at least one of an on-board computer, a portable electronic device 501, and a transceiver and wireless communication network interface for communicating information over the satellite communication link 506. After receiving the parameter request message, the onboard computer and/or the portable electronic device 501 may be configured to extract the parameter file from the parameter request message at the on-board computer and/or portable electronic device 501 aboard the aircraft 504, to determine the relevant parameters (and optionally the corresponding duration values for each of the relevant parameters from the parameter file), and to measure parametric data for each relevant parameter for a corresponding duration value and to record the measured parametric data in a data file. In some implementations, the measured parametric data for each of the relevant parameters comprises a data stream of measured parametric data for that particular relevant parameter that is measured for a particular corresponding duration value.

The transceiver is configured to transmit the data file over the first satellite communication link 506 to the satellite 508 for delivery to the ground support network 516 and to the other computer 546.

In one exemplary embodiment, upon receiving the data file, the satellite 508 may communicate the data file over the second satellite communication link 510 to the gateway 512, and the gateway 512 may communicate the data file to the ground support network 516. The ground support network 516 may communicate the data file to the server 542, which may communicate the data file to the computer 546 for display on a computer interface.

Figure 6:
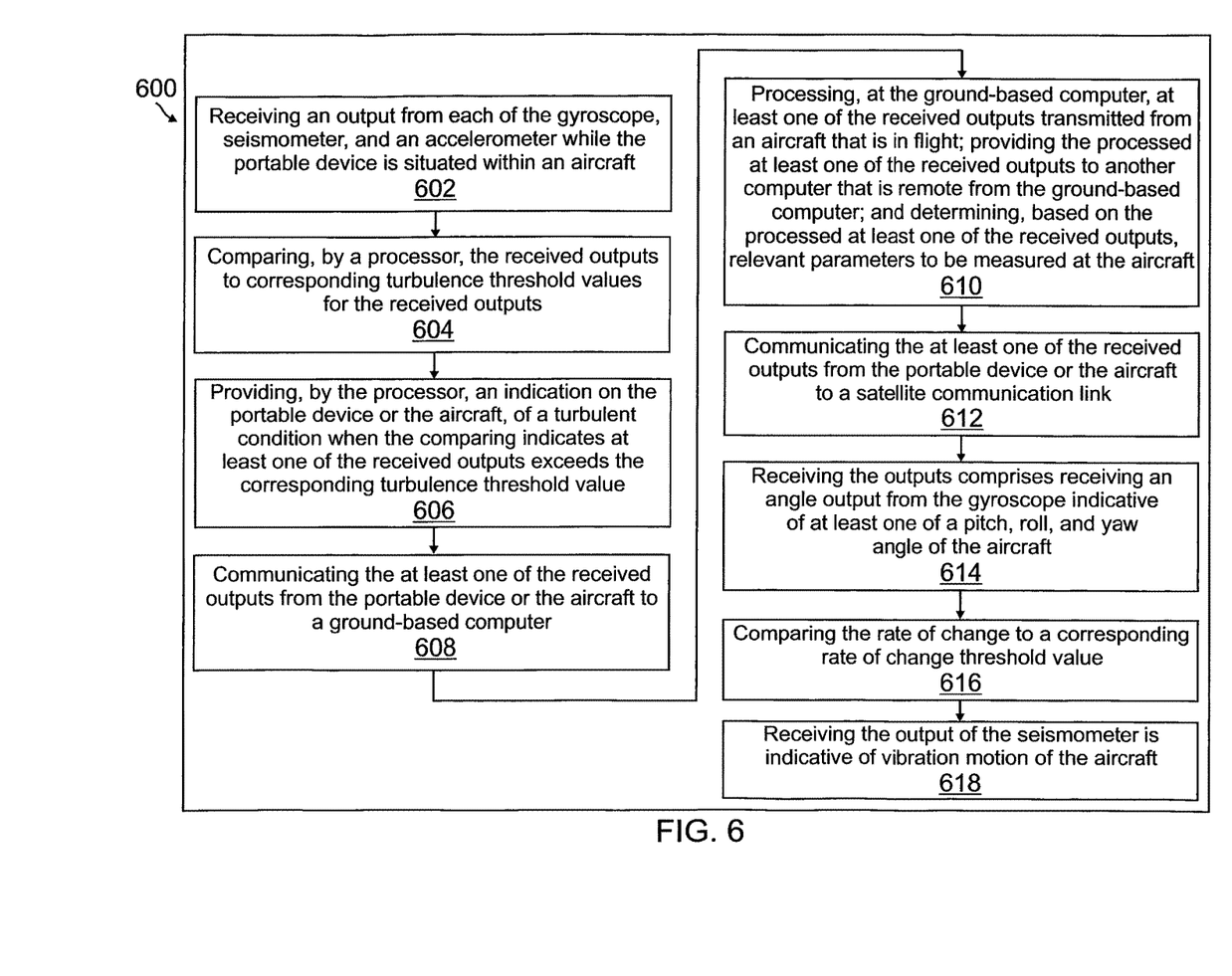
FIG. 6 shows a flowchart depicting an exemplary method, according to yet another embodiment of the present invention.

Proceeding to FIG. 6, a flow chart illustrates a method 600 for determining a turbulent condition in an aircraft with a portable device having a gyroscope, seismometer, a magnetometer, and an accelerometer. The method 600 may comprise a step 602 of receiving an output from each of the gyroscope, seismometer, and an accelerometer while the portable device is situated within an aircraft while a step 604 may comprise comparing, by a processor, the received outputs to corresponding turbulence threshold values for the received output.

The method 600 may comprise providing, by the processor, an indication on the portable device or the aircraft, of a turbulent condition when the comparing indicates at least one of the received outputs exceeds the corresponding turbulence threshold value as step 606. A step 608 may comprise communicating the at least one of the received outputs from the portable device or the aircraft to a ground-based computer.

A step 610 may further comprise processing, at the ground-based computer, at least one of the received outputs transmitted from an aircraft that is in flight; providing the processed at least one of the received outputs to another computer that is remote from the ground-based computer; and determining, based on the processed at least one of the received outputs, relevant parameters to be measured at the aircraft.

The method 600 may further comprise a step 612 of communicating the at least one of the received outputs from the portable device or the aircraft to a satellite communication link.

A step 614 may comprise receiving an angle output from the gyroscope indicative of at least one of a pitch, roll, and yaw angle of the aircraft. The method 600 may further comprise determining a rate of change for at least one of the pitch, roll, and yaw angle from the angle output. In step 616, the comparing may comprise comparing the rate of change to a corresponding rate of change threshold value. A step 618 may comprise receiving the output of the seismometer which is indicative of vibration motion of the aircraft.

Method 600 may further be performed in various situations, such as wherein the receiving the output of the accelerometer is indicative of the acceleration in multi-dimensional motion of the aircraft. The method 600 also may be conducted wherein the receiving the outputs comprises: receiving an angle output from the gyroscope indicative of a pitch, roll, and yaw angle of the aircraft, receiving a motion output from the seismometer, and receiving acceleration output from the accelerometer.

In another embodiment, the method 600 may include determining at least one of the motion and rate of change in motion of the aircraft in a multi-dimensional direction from the angle output, motion output, and acceleration output. In yet another embodiment, comprises executing software on the portable device that receives as input the angle output, motion output, and acceleration output and then calculates the at least one of the motion and rate of change of motion.

The method 600 may yet be conducted wherein the comparing comprises comparing the at least one of the motion and rate of change in motion to a corresponding motion threshold and motion rate of change threshold while a further embodiment may entail executing software on the portable device that compares the at least one of the motion and rate of change in the motion to the corresponding motion threshold and motion rate of change threshold.

In a still further embodiment, the method 600 may comprise compensating for a relative orientation of the portable device and the aircraft. In another embodiment, the providing the indication of the turbulent condition comprises providing an indication on the portable device. Method 600 may comprise an embodiment wherein the providing the indication on the portable device comprises at least one of displaying an indication on a display of the portable device and emitting an audible indication from the portable device. In yet another embodiment, the method 600 further comprises transmitting a turbulence signal from the portable device to the aircraft.

Other embodiments of method 600 may comprise providing an indication on a flight deck of the aircraft in response to the turbulence signal. Method 600 may operate wherein the providing the indication of the turbulent condition comprises transmitting a turbulence signal from the portable device to the aircraft. Another embodiment of method 600 further comprises comparing the received outputs to threshold values over time and providing an indication of a turbulent condition when the comparing indicates turbulence.

Figure 7:
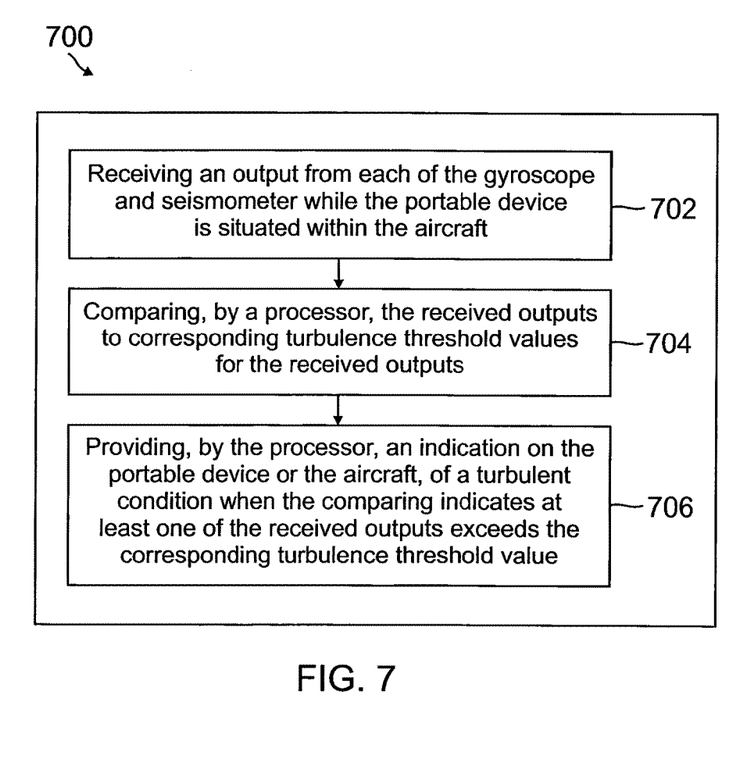
FIG. 7 shows a flowchart depicting an exemplary method, according to a still yet another embodiment of the present invention.

In FIG. 7, a method 700 for determining a turbulent condition in an aircraft with a portable device having a gyroscope, a magnetometer, and a seismometer is shown in a flow chart, the method 700 comprising a step 702 of receiving an output from each of the gyroscope and seismometer while the portable device is situated within the aircraft. A step 704 may comprise comparing, by a processor, the received outputs to corresponding turbulence threshold values for the received outputs. In a step 706, the method 700 may further comprise providing, by the processor, an indication on the portable device or the aircraft, of a turbulent condition when the comparing indicates at least one of the received output exceeds the corresponding turbulence threshold value.

Figure 8:
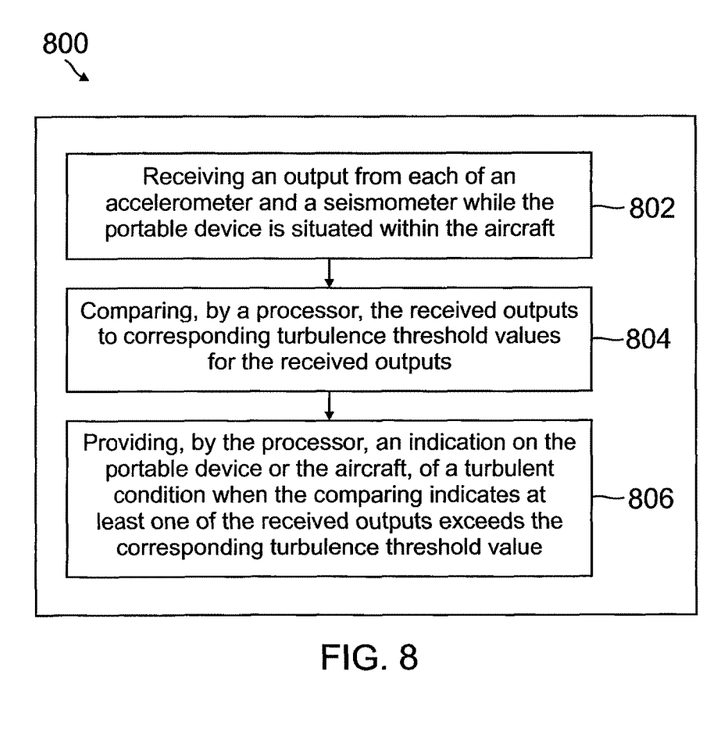
FIG. 8 shows a flowchart depicting an exemplary method, according to a further embodiment of the present invention.

A method 800 is illustrated in FIG. 8. The method 800 may comprise a method for determining a turbulent condition in an aircraft with a portable device having an accelerometer, a magnetometer, and a seismometer, such that the method comprises a step 802 of receiving an output from each of an accelerometer and a seismometer while the portable device is situated within the aircraft. A step 804 may comprise comparing, by a processor, the received outputs to corresponding turbulence threshold values for the received outputs. A step 806 may comprise providing, by the processor, an indication on the portable device or the aircraft, of a turbulent condition when the comparing indicates at least one of the received outputs exceeds the corresponding turbulence threshold value.

It should be understood, of course, that the foregoing relates to exemplary embodiments of the invention and that modifications may be made without departing from the spirit and scope of the invention as set forth in the following claims. Furthermore, a method herein described may be performed in one or more sequences other than the sequence presented expressly herein.

We claim:

1. A method for determining a turbulent condition in an aircraft, the method comprising:
   receiving a first output from each of a gyroscope, a seismometer, and an accelerometer while a first portable device, including the gyroscope, the seismometer, and the accelerometer, is situated within an aircraft;
   receiving a second output from each of a second gyroscope, a second seismometer, and a second accelerometer while a second portable device, including the second gyroscope, the second seismometer, and the second accelerometer, is situated within the aircraft;
   receiving an output from each of the gyroscope, the seismometer, and the accelerometer included within the second portable device;
   comparing, by a processor, the received first and second outputs from the first portable device and the received output from the second portable device to corresponding turbulence threshold values for the received outputs;
   providing, by the processor, an indication on each of the portable devices, of a turbulent condition when the comparing indicates at least one of the received outputs exceeds the corresponding turbulence threshold value;
   communicating the at least one of the received outputs from the portable devices to a ground-based computer;
   processing, at the ground-based computer, the received outputs transmitted from the portable devices aboard an aircraft that is in flight;
   providing the processed received outputs to another computer that is remote from the ground-based computer;
   examining the received outputs for harmonized motions spanning among the first and second portable devices aboard the aircraft; and
   determining, based on the processed received outputs, relevant parameters to be measured at the aircraft.

2. The method of claim 1, further comprising communicating the at least one of the received outputs from one of the portable devices to a satellite communication link.

3. The method of claim 1, wherein the receiving the outputs comprises receiving an angle output from at least one of the gyroscopes indicative of at least one of a pitch, roll, and yaw angle of the aircraft.

4. The method of claim 3, further comprising determining a rate of change for at least one of the pitch, roll, and yaw angle from the angle output.

5. The method of claim 4, wherein the comparing comprises comparing the rate of change to a corresponding rate of change threshold value.

6. The method of claim 1, wherein the receiving the output of one of the seismometers is indicative of vibration motion of the aircraft.

7. The method of claim 1, wherein the receiving the output of one of the accelerometers is indicative of the acceleration in multi-dimensional motion of the aircraft.

8. The method of claim 1, wherein the receiving the first outputs from the first portable device comprises: receiving an angle output from the gyroscope indicative of a pitch, roll, and yaw angle of the aircraft, receiving a motion output from the seismometer, and receiving acceleration output from the accelerometer.

9. The method of claim 8, further comprising determining at least one of the motion and rate of change in motion of the aircraft in a multi-dimensional direction from the angle output, motion output, and acceleration output.

10. The method of claim 9, wherein the determining comprises executing software on one of the portable devices that receives as input the angle output, motion output, and acceleration output and then calculates the at least one of the motion and rate of change of motion.

11. The method of claim 9, wherein the comparing comprises comparing the at least one of the motion and rate of change in motion to a corresponding motion threshold and motion rate of change threshold.

12. The method of claim 11, wherein the comparing comprises executing software on one of the portable devices that compares the at least one of the motion and rate of change in the motion to the corresponding motion threshold and motion rate of change threshold.

13. The method of claim 11, wherein the determining further comprises compensating for a relative orientation of the first portable device and the second portable device.

14. The method of claim 11, wherein the providing the indication of the turbulent condition comprises providing an indication on one of the portable devices.

15. The method of claim 14, wherein the providing the indication on one of the portable devices comprises at least one of displaying an indication on a display of one of the portable devices and emitting an audible indication from the portable device with the displayed indication.

16. The method of claim 11, wherein the providing the indication of the turbulent condition comprises transmitting a turbulence signal from one of the portable devices to the aircraft.

17. The method of claim 16, further comprising providing an indication on a flight deck of the aircraft in response to the turbulence signal.

18. The method of claim 1, wherein the providing the indication of the turbulent condition comprises transmitting a turbulence signal from one of the portable devices to the aircraft.

19. The method of claim 1, further comprising comparing the received first and second outputs to threshold values and providing an indication of a turbulent condition when the comparing indicates turbulence.

* * * * *